United States Patent
Bing et al.

(10) Patent No.: US 8,224,106 B2
(45) Date of Patent: Jul. 17, 2012

(54) IMAGE ENHANCEMENT SYSTEM AND METHOD USING AUTOMATIC EMOTION DETECTION

(75) Inventors: Han Bing, Yongin-si (KR); Peter Bodrogi, Pfungstadt (DE); Du-Sik Park, Suwon-si (KR); Young Shin Kwak, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1049 days.

(21) Appl. No.: 12/166,676

(22) Filed: Jul. 2, 2008

(65) Prior Publication Data

US 2009/0141983 A1 Jun. 4, 2009

(30) Foreign Application Priority Data

Dec. 4, 2007 (KR) .................. 10-2007-0125194

(51) Int. Cl.
*G06K 9/40* (2006.01)
(52) U.S. Cl. ...................................................... 382/254
(58) Field of Classification Search .................. 382/118, 382/190, 206, 218, 254; 348/606; 358/447, 358/463
See application file for complete search history.

(56) References Cited

U.S. PATENT DOCUMENTS

| | | | | |
|---|---|---|---|---|
| 5,676,138 A | * | 10/1997 | Zawilinski | 600/301 |
| 7,751,599 B2 | * | 7/2010 | Chen et al. | 382/118 |
| 2005/0168595 A1 | | 8/2005 | White | |
| 2007/0291334 A1 | * | 12/2007 | Nakanishi | 358/509 |
| 2008/0091515 A1 | * | 4/2008 | Thieberger et al. | 705/10 |
| 2008/0260212 A1 | * | 10/2008 | Moskal et al. | 382/118 |

FOREIGN PATENT DOCUMENTS

| | | |
|---|---|---|
| JP | 2005-12285 | 1/2005 |
| JP | 2005-235066 | 9/2005 |
| JP | 2006-173856 | 6/2006 |
| KR | 1998-87759 | 12/1998 |
| KR | 2006-39983 | 5/2006 |
| KR | 2007-55925 | 5/2007 |

* cited by examiner

*Primary Examiner* — Daniel Mariam
(74) *Attorney, Agent, or Firm* — Staas & Halsey LLP (57) ABSTRACT

An image enhancement system and method using automatic emotion detection, the image enhancement system including: an emotional scale detection unit to analyze a pixel value of one or more frames of an input image in order to automatically detect an emotional scale of the input image; and an image enhancement unit to enhance a quality of the input image based on an image mode selected according to the emotional scale.

36 Claims, 5 Drawing Sheets

|  | IMAGE PARAMETER |
| --- | --- |
| V1 | AVERAGE LUMINANCE |
| V2 | NOISENESS |
| V3 | AVERAGE SATURATION |
| V4 | GLOBAL CONTRAST |
| V5 | GLOBAL SATURATION CONTRAST |
| V6 | COLOR BALANCE |
| V7 | CHROMATIC HIGHLIGHT |
| V8 | HIGHLIGHT |
| V9 | SHARPNESS |
| V10 | SHARPNESS BLOCK |
| V11 | SPEED OF DARKENING/LIGHTENING |
| V12 | SPEED OF SATURATION |
| V13 | SPEED OF OBJECT |
| V14 | SPEED OF CAMERA MOTION |
| V15 | SKIN CONTRAST |

FIG. 5

IMAGE ENHANCEMENT SYSTEM AND METHOD USING AUTOMATIC EMOTION DETECTION

CROSS-REFERENCE TO RELATED APPLICATION

This application claims the benefit of Korean Patent Application No. 2007-125194, filed Dec. 4, 2007, in the Korean Intellectual Property, the disclosure of which is incorporated herein by reference.

BACKGROUND OF THE INVENTION

1. Field of the Invention

Aspects of the present invention relate to an image enhancement system and method using an automatic emotion detection, and more particularly, to an image enhancement system and method that detects an emotional scale using a Z score with respect to an image parameter of an image, selects an image mode according to the emotional scale, and thereby enhances a quality of the image.

2. Description of the Related Art

Generally, an image reproduction apparatus reproduces various kinds of images that evoke an emotional response from a viewer. For example, fun images can evoke a positive emotion and scary images can evoke a negative emotion.

Emotion is a physical and/or a mental response unconsciously triggered by the mind. Emotion can be referred to as a complex set of interactions among subjective and objective factors, mediated by neural and/or hormonal systems, which can give rise to affective pleasant or unpleasant experiences.

Conventionally, the image reproduction apparatus defines genres of categorized images, and optimal settings for each genre is manually adjusted by a user, resulting in an inconvenience to the user. Also, when an undifferentiated setting with respect to an identical genre is applied, an image factor represented by a particular scene cannot be reflected. Accordingly, there is a need for a new image enhancement system and method.

SUMMARY OF THE INVENTION

Aspects of the present invention provide an image enhancement system and method that automatically detect an emotion using a Z score with respect to an image parameter of an input image, and thereby can efficiently reflect an emotion caused by an image.

Aspects of the present invention also provide an image enhancement system and method that calculates an emotional scale using a Z score, which is statistical data of an image to objectively apply an emotion to image enhancement.

Aspects of the present invention also provide an image enhancement system and method that selects an image mode according to an emotional scale, adjusts an image factor according to the selected image mode, and thereby can correspond to a mode of an input image.

Aspects of the present invention also provide an image enhancement system and method that calculates one or more image parameters, applies the image parameters to image enhancement, and thereby can accurately reflect an emotion using the image parameters.

According to an aspect of the present invention, there is provided an image enhancement system to adjust an input image according to an emotional scale of the input image, the image enhancement system including: an emotional scale detection unit to analyze a pixel value of one or more frames of the input image in order to automatically detect the emotional scale of the input image; and an image enhancement unit to enhance a quality of the input image based on an image mode selected according to the emotional scale.

The emotional scale detection unit may include: an image parameter calculation unit to calculate at least one image parameter using the pixel value; and a Z score computation unit to compute a Z score of each of the at least one image parameter using image statistical data.

The image parameter calculation unit may perform a color space conversion on the pixel value of the input image according to an image parameter, of the at least one image parameter, to be calculated.

The image enhancement unit may include: an image mode selection unit to select an image mode of the input image according to the emotional scale; and an image factor adjustment unit to adjust an image factor of the input image based on an image factor adjustment parameter according to the image mode.

According to another aspect of the present invention, there is provided an image enhancement method to adjust an input image according to an emotional scale of the input image, the method including: analyzing a pixel value of one or more frames of the input image in order to automatically detect the emotional scale of the input image; and enhancing a quality of the input image based on an image mode selected according to the emotional scale.

The detecting of the emotional scale may include: calculating at least one image parameter using the pixel value; and computing a Z score of each of the at least one image parameter using image statistical data.

The enhancing of the quality of the input image may include: selecting an image mode of the input image according to the emotional scale; and adjusting an image factor of the input image based on an image factor adjustment parameter according to the image mode.

According to yet another aspect of the present invention, there is provided an image enhancement system to adjust an input image according to an emotional scale of the input image, the image enhancement system including: an image parameter calculation unit to calculate at least one image parameter using a pixel value of an input image; a Z score computation unit to compute a Z score of each of the at least one image parameter using image statistical data; an image mode selection unit to select an image mode of the input image according to the emotional scale detected using the Z score; and an image factor adjustment unit to adjust an image factor of the input image based on an image factor adjustment parameter according to the image mode.

According to still another aspect of the present invention, there is provided an image enhancement method to adjust an input image according to an emotional scale of the input image, the image enhancement method including: calculating at least one image parameter using a pixel value of an input image; computing a Z score of each of the at least one image parameter using image statistical data; selecting an image mode of the input image according to the emotional scale detected using the Z score; and adjusting an image factor of the input image based on an image factor adjustment parameter according to the image mode.

According to another aspect of the present invention, there is provided an image enhancement system to adjust an input image, the image enhancement system including: an emotional scale detection unit to automatically detect an emotional scale of the input image; and an image enhancement unit to enhance a quality of the input image according to the emotional scale.

According to another aspect of the present invention, there is provided an image enhancement method to adjust an input image, the image enhancement method including: automatically detecting an emotional scale of the input image; and enhancing a quality of the input image according to the emotional scale.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
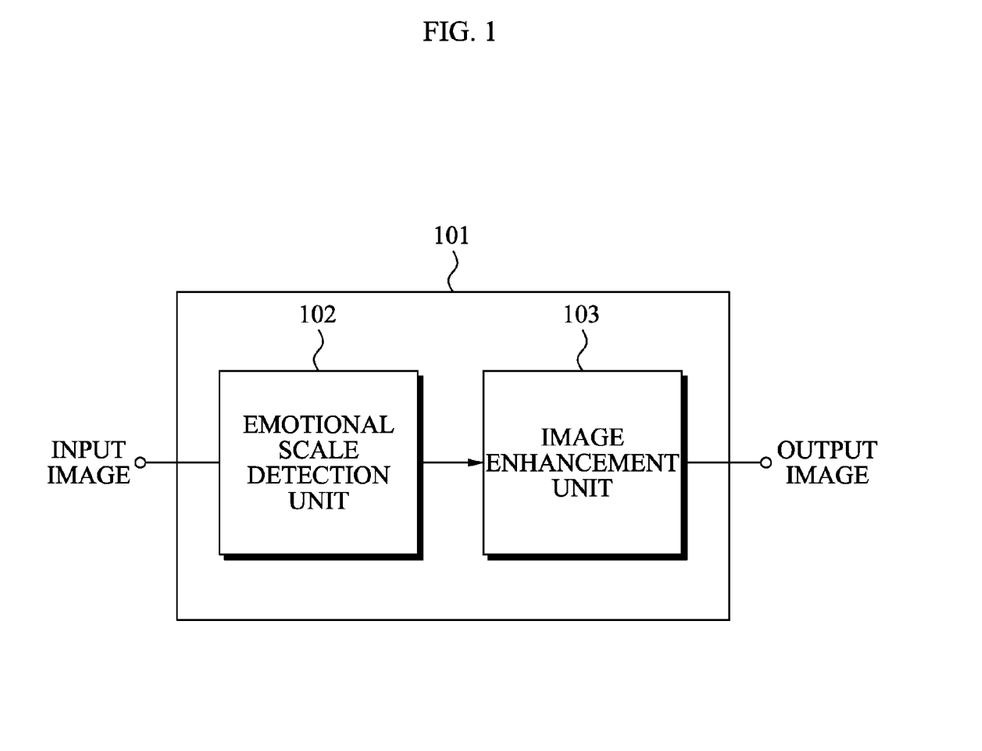
FIG. 1 illustrates an image enhancement system using automatic emotion detection according to an embodiment of the present invention.

FIG. 1 illustrates an image enhancement system 101 using automatic emotion detection according to an embodiment of the present invention. Referring to FIG. 1, the image enhancement system 101 includes an emotional scale detection unit 102 and an image enhancement unit 103.

The emotional scale detection unit 102 analyzes a pixel value of each frame of an input image and automatically detects an emotional scale of the input image. For example, according to aspects of the present invention, the emotional scale detection unit 102 analyzes a pixel value included in a single scene of an image and automatically detects an emotional scale of the scene.

The emotional scale is emotional category data to identify at least one emotion. That is, the emotional scale can be mathematical data that represents an emotion caused by the single scene of the input image. Also, the emotional scale can be detected through an image parameter calculated using the pixel value of each of the frames of the input image.

Emotional category labels can be classified into a positive emotional label and a negative emotional label. For example, the positive emotional label includes amusement, happiness, excitement, interest, desire, curiosity, peacefulness, affection, etc., and the negative emotional label includes fear, sadness, disgust, anger, pity, scare, shock, etc.

The image enhancement unit 103 enhances a quality of the input image based on an image mode selected according to the emotional scale. That is, the image enhancement unit 103 selects the image mode according to the emotional scale, and adjusts an image factor according to the image mode to thereby enhance the quality of the image. The emotional scale detection unit 102 and the image enhancement unit 103 are described in greater detail with reference to FIGS. 2 and 3, respectively.

Figure 2:
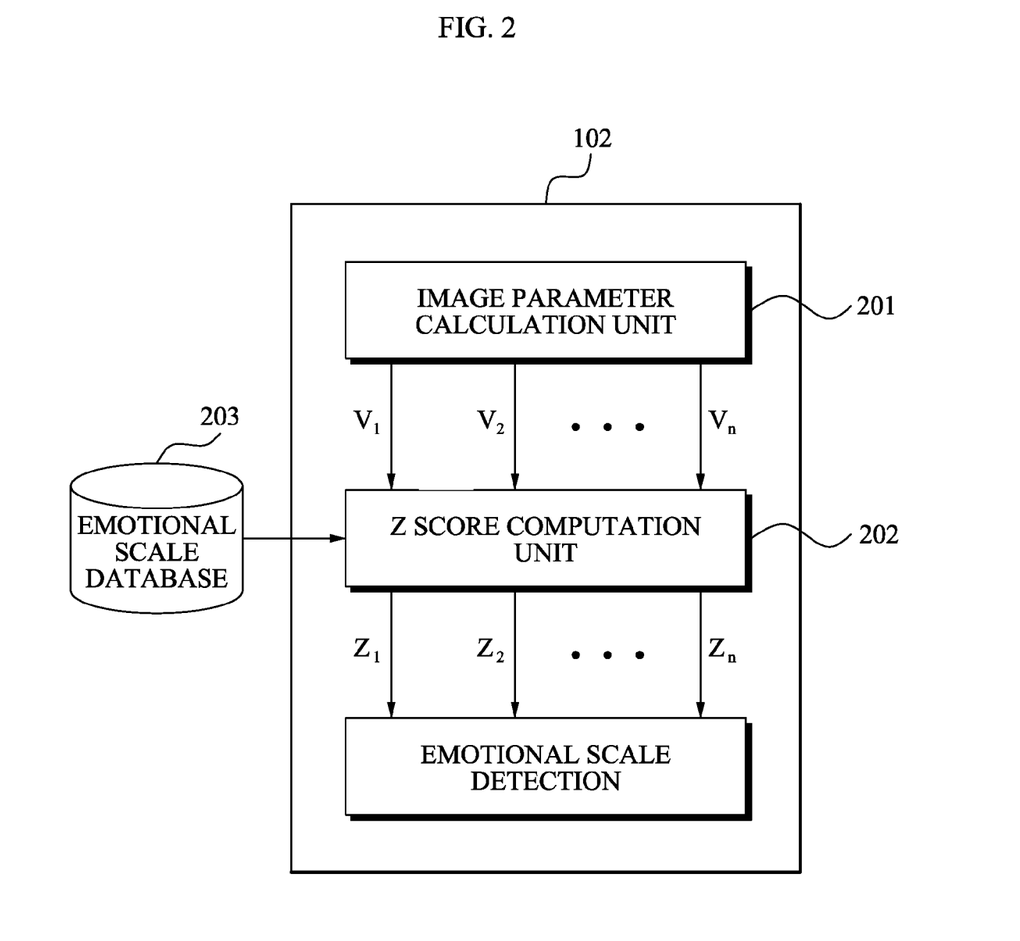
FIG. 2 illustrates an emotional scale detection unit of the image enhancement system of FIG. 1.

FIG. 2 illustrates the emotional scale detection unit 102 of the image enhancement system 101 of FIG. 1. Referring to FIG. 2, the emotional scale detection unit 102 includes an image parameter calculation unit 201 and a Z score computation unit 202.

The image parameter calculation unit 201 calculates at least one image parameter using a pixel value of an input image. For example, the image parameter can be a mathematical parameter representing a physical property of each frame of the input image. The image parameter calculation unit 201 may calculate more than one image parameter, configured as a set of parameters (including, for example, an average luminance, Fourier spectrum, etc.).

The at least one image parameter can be calculated using pixel values of a Red, Green, Blue (RGB) color space. However, it is understood that aspects of the present invention are not limited thereto. According to other aspects, the at least one image parameter can be calculated using pixel values of YCbCr, Hue, Saturation, Value (HSV), sRGB, CIECAM02, CIEL*a*b, CIEXYZ, or YUV color spaces. As illustrated in FIG. 2, the image parameter calculation unit 201 can calculate the image parameter, $V_1, V_2 \ldots V_n$ using the pixel value of the input image.

Furthermore, the image parameter calculation unit 201 may perform a color space conversion with respect to the pixel value of the input image according to an image parameter to be calculated. Specifically, the image parameter calculation unit 201 may perform a color space conversion from the RGB color space to the YCbCr, HSV, sRGB, CIECAM02, CIEL*a*b, CIEXYZ, and YUV color space according to the image parameter to be calculated. A type of image parameter and a calculation algorithm are described in detail with reference to FIG. 4.

The Z score computation unit 202 computes a Z score of each image parameter using image statistical data about a plurality of genres. In this instance, the Z score computation unit 202 can compute the Z score using an average and a standard deviation of an image parameter of various images. The Z score indicates a standard score used for a statistical analysis. Here, it is assumed that the image statistical data is based on a standard normal distribution. For example, the Z score can be computed according to Equation 1:

$$Z_j = \frac{(V_j - V_{j\_mean})}{V_{j\_stdev}} (j = 1, 2, \ldots, n), \qquad \text{[Equation 1]}$$

where $Z_j$ denotes a Z score with respect to each image parameter, $V_j$ denotes each computed image parameter, and $V_{j\_mean}$ and $V_{j\_stdev}$ denote image statistical data that statistically represents the image parameter of various images. Specifically, $V_{j\_mean}$ and $V_{j\_stdev}$ denote the average and the standard deviation of the image parameter, respectively. Furthermore, $V_{j\_mean}$ and $V_{j\_stdev}$ may be statistical data previously extracted through a plurality of images with respect to a corresponding image parameter. $V_{j\_mean}$ and $V_{j\_stdev}$ can be stored in an emotional scale database 203 in advance and used when computing the Z score. Referring to FIG. 2, each of the image parameters, $V_1, V_2 \ldots V_n$, calculated by the image parameter calculation unit 201 corresponds to Z scores, $Z_1, Z_2 \ldots Z_n$.

The emotional scale detection unit 102 detects an emotional scale of the input image using the computed Z score and a Z score of an image parameter with respect to at least one predetermined emotional scale. For example, the emotional scale detection unit 102 may detect the emotional scale of the input image according to Equation 2:

$$D_k = \sum_{j=1}^{n} (Z_j - Z_{j,k\_mean})^2, \qquad \text{[Equation 2]}$$

where $Z_j$ denotes the computed Z score, $Z_{j,k\_mean}$ denotes an average Z score of each image parameter with respect to at least one predetermined emotional scale k (k=1, ..., i), and $D_k$, which is an emotional scale, denotes a Euclidean distance of $Z_j$.

In this case, the emotional scale detection unit 102 determines a difference between the computed Z score and the average Z score of each of the image parameters with respect to the at least one predetermined emotional scale, and detects an emotional scale having a minimum difference as the emotional scale of the input image. That is, the emotional scale k having $D_k$ corresponding to the minimum difference is detected as the emotional scale of the input image.

For example, it is assumed that a computed Z score is 3.5 when an average Z score of each image parameter representing happiness, tiresomeness, shock, sadness, anger, and amusement is 1, 8, 10, 4, 7, and 3. Accordingly, the emotional scale detection unit 102 detects an emotional scale of an input image as amusement.

Figure 3:
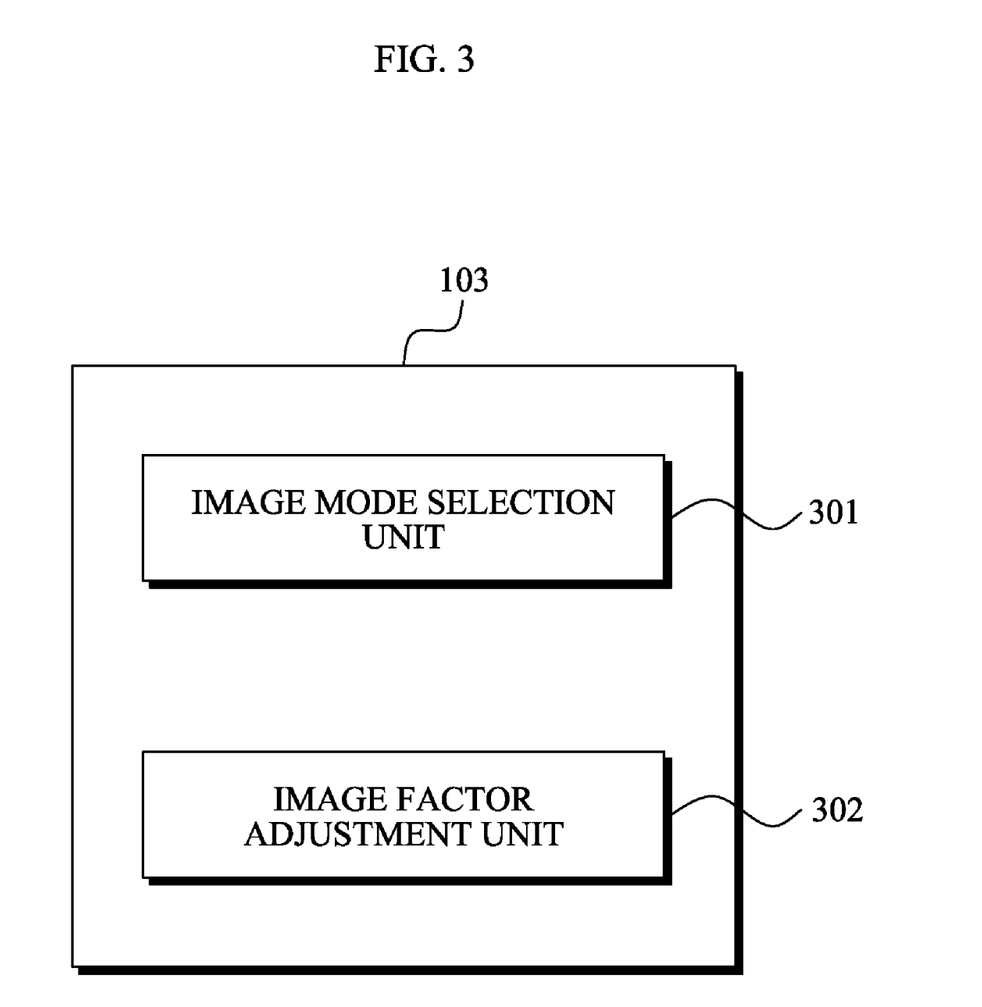
FIG. 3 illustrates an image enhancement unit of the image enhancement system of FIG. 1.

FIG. 3 illustrates the image enhancement unit 103 of the image enhancement system 101 of FIG. 1. Referring to FIG. 3, the image enhancement unit 103 includes an image mode selection unit 301 and an image factor adjustment unit 302.

The image mode selection unit 301 selects an image mode of an input image according to an emotional scale. For example, any one of various emotions can be selected with respect to a particular scene of the input image according to the emotional scale.

The image factor adjustment unit 302 adjusts an image factor of the input image using an image factor adjustment parameter according to the image mode. For example, the image factor adjustment parameter can have a (−) value and a (+) value, and indicate a constant of a predetermined range. In this case, the image factor can include lightness, contrast, and saturation, though aspects of the present invention are not limited thereto. That is, the above-described image factor is simply an example, and can vary according to a configuration of the system 101.

According to an embodiment of the present invention, the image factor adjustment unit 302 may adjust a contrast, which is the image factor of the input image in the present example, according to Equation 3:

$$dac_{out} = \tan\left(\frac{\pi}{400}p + \frac{\pi}{4}\right)(dac_{in} - M'_{lum}) + M'_{lum}, \qquad \text{[Equation 3]}$$

where $dac_{out}$ and $dac_{in}$ denote any one of an output and input RGB of a current pixel, and $M'_{lum}$ denotes a corrected average luminance value. When $dac_{out}$ is less than 0, (for example, −2) $dac_{out}$ may be set as 0. When $dac_{out}$ is greater than 255, (for example, 260) $dac_{out}$ may be set as 255. When $dac_{out}$ is from 0 to 255, $dac_{out}$ may be maintained as is. Each constant can vary according to the configuration of the system 101.

According to an embodiment of the present invention, the image factor adjustment unit 302 may adjust a lightness, which is the image factor of the input image in the present example, according to Equation 4:

$$dac_{out} = dac_{in} + p, \qquad \text{[Equation 4]}$$

where $dac_{out}$ and $dac_{in}$ denote any one of the output and input R, G, B of the current pixel, and p denotes the image factor adjustment parameter. When $dac_{out}$ is less than 0, $dac_{out}$ can be set as 0. When $dac_{out}$ is greater than 255, $dac_{out}$ can be set as 255. Also, when $dac_{out}$ is from 0 to 255, $dac_{out}$ can be maintained as is.

According to an embodiment of the present invention, the image factor adjustment unit 302 may adjust a saturation, which is the image factor of the input image in the present example, according to Equation 5:

$$S_{out} = S_{in} + p \quad (p: \text{positive number}), \qquad \text{[Equation 5]}$$
$$dac_{out} = dac_{in} + (Gr - dac_{in})\left(\frac{-p}{100}\right) \quad (p: \text{negative number}),$$
$$Gr = \frac{\min(dac_{rgb}) + \max(dac_{rgb})}{2}.$$

where p denotes the image factor adjustment parameter, and $dac_{rgb}$ denotes a value of each of the R, G, and B. Each constant can vary according to the configuration of the system 101. As shown in Equation 5, an operation of adjusting the saturation can vary according to the p value.

Figure 4:
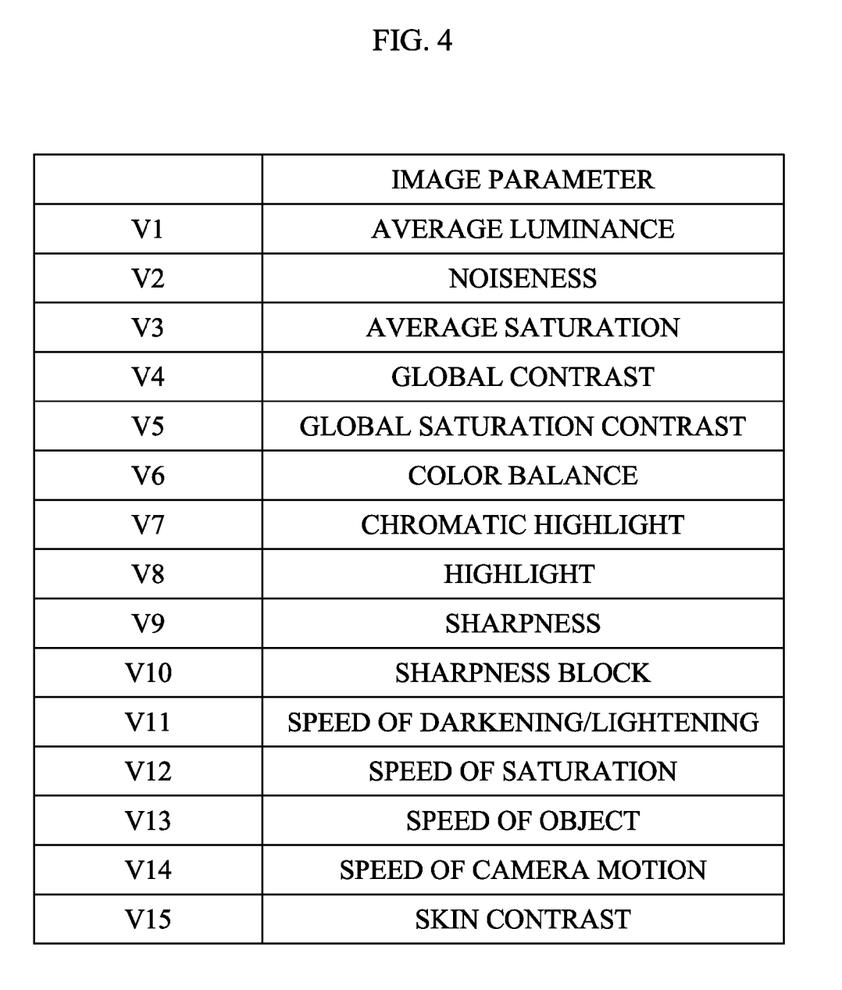
FIG. 4 illustrates an example of image parameters according to an embodiment of the present invention.

FIG. 4 illustrates an example of image parameters according to an embodiment of the present invention. As described above with reference to FIG. 2, the image parameter calculation unit 201 calculates at least one image parameter using a pixel value of an input image. It is understood that the image parameters illustrated in FIG. 4 are simply an example, and can vary according to a type of the system 101. Also, it is understood that a method of calculating an image parameter is not limited to the following described method. V1 to V15 of FIG. 4 correspond to image parameters, $V_1, V_2 \ldots V_n$, calculated by the image parameter calculation unit 201. Hereinafter, the method of calculating an image parameter of FIG. 4 is described in detail.

1. Average Luminance

As an example, the image parameter calculation unit 201 can compute an average luminance as an image parameter using Equation 6:

$$M_{lum} = \frac{\sum_{i=1}^{n} \sum_{j=1}^{m} Y_{i,j}}{n*m}, \quad Y = a + b*R + c*G + d*B, \qquad \text{[Equation 6]}$$

where $M_{lum}$ denotes the average luminance, n and m denote width and length of an image, respectively, i and j denote a horizontal location and a vertical location of a pixel, respectively, Y is a value where an R, G, B value of the input image is converted into a luminance value, and a, b, c, and d are constants.

2. Noisiness

As an example, the image parameter calculation unit 201 can compute a noisiness as an image parameter using Equation 7:

$$M_{noise} = \frac{\sum_{i=1}^{n}\sum_{j=1}^{m} STD(\max_{i,j})}{n*m},$$ [Equation 7]

$$STD(\max_{i,j}) = \max_{p=r,g,\text{or } b}\left(\frac{\sum_{n=1}^{i}\sum_{m=1}^{j}(p_{i,j})^2 - \frac{\sum_{n=1}^{i}\sum_{m=1}^{j}(p_{i,j})^2}{k^2}}{k^2-1}\right),$$

where k denotes a size of a kernel, i and j denote a horizontal location and a vertical location of a pixel, respectively, and p denotes an R, G, B value.

3. Average Saturation

As an example, the image parameter calculation unit 201 can compute an average saturation as an image parameter using Equation 8:

$$M_{sat} = \frac{\sum_{i=1}^{n}\sum_{j=1}^{m} S_{i,j}}{n*m},$$ [Equation 8]

where $M_{sat}$ denotes the average saturation for each frame of the input image, n and m denote the width and length of the image, respectively, i and j denote the horizontal location and vertical location of a pixel, respectively, and S denotes a saturation value of a pixel located in (i, j).

4. Global Contrast

As an example, the image parameter calculation unit 201 can compute a global contrast as an image parameter using Equation 9:

$$d_{gc} = M_{lum,hi} - M_{lum,lo},$$ [Equation 9]

where $d_{gc}$ denotes the global contrast, $M_{lum,hi}$ denotes an average luminance of pixels having a luminance value greater than an overall average luminance for each frame of the input image, and $M_{lum,lo}$ denotes an average luminance of pixels having a luminance value less than the overall average luminance for each frame of the input image.

5. Global Saturation Contrast

As an example, the image parameter calculation unit 201 can compute a global saturation contrast as an image parameter using Equation 10:

$$d_{gsc} = M_{sat,hi} - M_{sat,lo},$$ [Equation 10]

where $d_{gsc}$ denotes the global saturation contrast, $M_{sat,hi}$ denotes an average saturation value of pixels having a saturation value greater than an overall average saturation value for each frame of the input image, and $M_{sat,lo}$ denotes an average saturation value of pixels having a saturation value less than an overall average saturation value for each frame of the input image.

6. Color Balance

As an example, the image parameter calculation unit 201 can compute a color balance as an image parameter using Equation 11:

$$\begin{bmatrix} X \\ Y \\ Z \end{bmatrix} = \begin{bmatrix} a & b & c \\ d & e & f \\ g & h & i \end{bmatrix} \begin{bmatrix} d(r) \\ d(g) \\ d(b) \end{bmatrix},$$ [Equation 11]

$$d(p) = \left(\frac{p}{255}\right)^t, \quad \overline{P} = \frac{\sum_{i=1}^{n}\sum_{j=1}^{m} P_{i,j}}{n*m},$$

where the color balance reflects whether the input image has a cool or warm appearance. For example, the color balance indicates a color temperature closest to an average chromaticity (x, y), after mathematically averaging CIE 1931 tristmulus values of pixels using an sRGB color space conversion. Referring to Equation 11, p denotes an R, G, B value of an input pixel, and a, b, c, d, e, f, g, h, and i denote constants. For example, a, b, c, d, e, f, g, h, and i can be 41.24, 35.76, 18.05, 21.26, 71.52, 7.22, 1.93, 11.92, and 95.05, respectively. Furthermore, $\overline{P}$ denotes an average X, Y, and Z of an input image having a size of n*m, and t denotes a current color temperature of the input image.

The color temperature of the input image is used to satisfy Equation 12:

$$(\overline{X} - X_{PI(T)})^2 + (\overline{Y} - Y_{PI(T)})^2 = \min,$$ [Equation 12]

$$\overline{X} = \frac{X}{X+Y+Z}, \overline{Y} = \frac{Y}{X+Y+Z},$$

where T denotes the color temperature, $X_{PI(T)}$ and $Y_{PI(T)}$ denote the color temperature of the input image, and $\overline{X}$, $\overline{Y}$ and $\overline{Z}$ denote an average of each of the X, Y, and Z, respectively.

7. Chromatic Highlights

A highly chromatic area with respect to an input image having a high input value can be shown. As an example, a chromatic highlight may be calculated as follows:

(1) A histogram of each channel of the R, G, B of the input image is built.

(2) Pixels with a value in the top 1% with respect to each of the channels are extracted.

(3) A binary image (B & W image) is created where white pixels are the pixels extracted in operation (2), and the remaining pixels are black.

(4) A size of a white object in the binary image is measured.

(5) The size of the object and a dominant hue extracted from an average HSV value is returned.

8. Highlights

Highlights can be shown in an image having a high input value. As an example, the highlights may be obtained as follows:

(1) A histogram of each channel of the R, G, B of the input image is built.

(2) Pixels with a value in the top 1% with respect to each of the channels are extracted.

(3) A binary image (B & W image) is created where white corresponds to the pixels in the top 1% of all channels and black corresponds to a rest.

(4) A vertical and horizontal standard deviation (STD) of white pixels in the binary image are determined.

(5) An STD value of STD=$\sqrt{STD_{ver}^2 + STD_{hor}^2}$ is returned, where $STD_{ver}$ denotes the vertical STD, and $STD_{hor}$ denotes the horizontal STD. An STD value is 0 when a white area is less than 1% of the entire image.

9. Sharpness

To compute the sharpness of the input image, a discrete cosine transformation (DCT) with respect to each of the R, G, and B channels of the input image is performed. In this case, a high frequency area is omitted in the input image. In the DC transformed image, when an amplitude of upper harmonics is greater than a reference value (for example 32), the input image can be considered as vivid. For example, the image parameter calculation unit 201 can compute the sharpness as an image parameter according to Equation 13:

$$D_{sh} = \frac{c}{size_{DCT} - c} \times 100\%,$$ [Equation 13]

where c denotes a number of high frequency components in the DC transformed image from among each pixel of the input image, the number of high frequency components is greater than 32, and $size_{DCT}$ denotes a size of the DC transformed image.

10. Sharpness Block

A sharpness block represents a relationship of a blurred and sharp area. The sharpness block can be computed as an image parameter according to Equation 14:

$$D_{shb} = \frac{N_{sh}}{N_{bl}} \times 100\%,$$ [Equation 14]

where $N_{sh}$ denotes a number of sharp segments, and $N_{bi}$ denotes a number of blurred segments. For example, an image can be segmented into a segment of n*n size.

11. Speed of Darkening/Lightening

A speed of darkening/lightening indicates a change rate of a light and dark area. The speed of darkening/lightening can be computed as an image parameter according to Equation 15:

$$m'(i) = \frac{1}{2}(m(i+1) - m(i-1)),$$

$$M_{dark/light} = \frac{\sum_{i=1}^{n} m'(i)}{n},$$ [Equation 15]

where m'(i) denotes a numerical derivative of m(i), i denotes a number of samples in a clip, and n denotes a length of the sample. When the clip includes a dark area, M is a negative number, and when the clip includes a light area, M is a positive number.

12. Speed of Saturation

A speed of saturation can be computed as an image parameter according to the above Equation 15, which replaces a computed speed of darkening/lightening with an average saturation over time.

13. Speed of Object

A speed of object indicates a velocity of a motion object in the input image. The speed of object cannot be computed in a still image. Also, the image parameter calculation unit 201 can compute the speed of object as an image parameter according to the following operations.

(1) An image is separated into a background and foreground, and an object is detected.

(2) A binary image is created where a motion segment is white and remaining segments are black.

(3) When the object is larger than a predetermined size, a histogram of the object is generated.

(4) When a similar cumulative histogram is retrieved in a subsequent frame after creating a cumulative histogram, the object is considered to be in motion.

(5) A velocity can be computed using a magnitude of the motion.

14. Speed of Camera Motion

A speed of camera motion can be computed in the image as an image parameter.

15. Skin Contrast

A skin contrast can be measured as an image parameter using a skin tone in the image. An operation of measuring the skin tone is similar to an operation of computing the global contrast, and may be performed as follows.

(1) It is assumed that a display device displays the image in an sRGB color space. A CIEXYZ value is determined first using a gamma value, and the sRGB color space is converted into an XYZ color space by a conversion matrix. The above operation is referred to as an operation of computing the color balance.

(2) A CIE L*a*b value is determined using a sum of rows of the sRGB conversion matrix.

(3) When L* is greater than 30, hue is between 18 and 80, and saturation (Cab*) is between 10 and 30, a pixel is considered as the skin tone and remaining pixels are ignored.

When a difference between averages of a lower and higher lightness value of skin tone pixels is greater than a predetermined reference value, the input image is determined to include a harsh tone, and when the difference is less than the reference value, the input image is determined to include a smooth tone.

Figure 5:
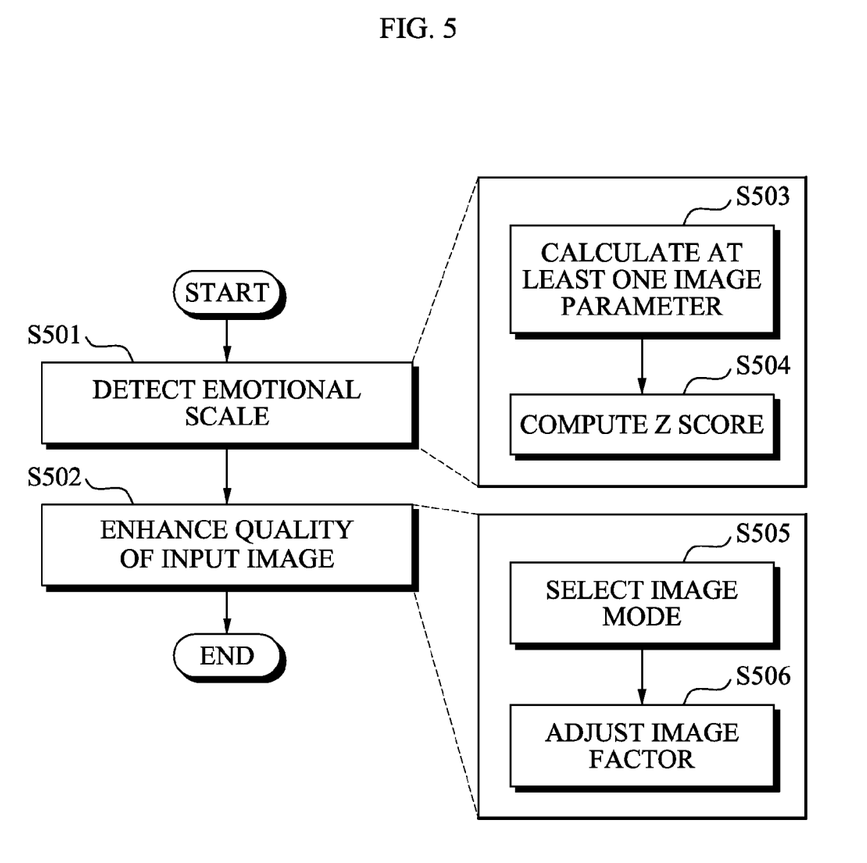
FIG. 5 illustrates an image enhancement method using automatic emotion detection according to an embodiment of the present invention.

FIG. 5 illustrates an image enhancement method using automatic emotion detection according to an embodiment of the present invention. Referring to FIG. 5, the image enhancement method analyzes a pixel value of each frame of an input image and automatically detects an emotional scale of the input image in operation S501. Then, a quality of the input image is enhanced based on an image mode selected according to the emotional scale in operation S502.

The detecting of the emotional scale (operation S501) includes calculating at least one image parameter using the analyzed pixel value in operation S503 and computing a Z score of each of the at least one image parameter using image statistical data in operation S504.

The calculating of the at least one image parameter (operation S503) may include performing a color space conversion with respect to the pixel value of the input image according to an image parameter to be calculated. Furthermore, it is understood that the image parameter is a mathematical parameter representing a physical property of each of the frames of the input image.

The computing of the Z score (operation S504) may compute the Z score using an average and a standard deviation of an image parameter of various images. In this case, the detecting of the emotional scale (operation S501) may detect the emotional scale of the input image using the computed Z score and a Z score of an image parameter with respect to at least one predetermined emotional scale. Furthermore, the detecting of the emotional scale (operation S501) may determine a difference between the computed Z score and an average Z score of all image parameters with respect to the at least one predetermined emotional scale, and detect an emotional scale having a minimum difference as the emotional scale of the input image.

The enhancing of the quality of the input image (operation S502) includes selecting an image mode of the input image according to the emotional scale in operation S505, and adjusting an image factor of the input image using an image factor adjustment parameter according to the image mode in operation S506.

The selecting of the image mode (operation S505) may include selecting the image mode of the input image based on an image mode corresponding to a predetermined emotional scale. The adjusting adjusting of the image factor (operation S506) may adjust a lightness, a contrast, and/or a saturation of the input image using the image factor adjustment parameter according to the image mode.

It is understood that any operations of the image enhancement method which have not been described with reference to FIG. 5 have been described with reference to FIGS. 1 through 4.

Aspects of the present invention may be embodied in a computer-readable media including program instructions to implement various operations embodied by a computer. The media may also include, alone or in combination with the program instructions, data files, data structures, and the like. The media and program instructions may be those specially designed and constructed for the purposes the example embodiment of the present invention, or they may be of the kind well-known and available to those having skill in the computer software arts. Examples of computer-readable media include magnetic media such as hard disks, floppy disks, and magnetic tape, optical media, for example, CD ROM disks and DVD, magneto-optical media, for example, optical disks, and hardware devices that may be specially configured to store and perform program instructions, for example, read-only memory (ROM), random access memory (RAM), flash memory, and the like. Aspects of the present invention may also be realized as a data signal embodied in a carrier wave and comprising a program readable by a computer and transmittable over the Internet. Examples of program instructions include both machine code, for example, produced by a compiler, and files containing higher level code that may be executed by the computer using an interpreter. The described hardware devices may be configured to act as one or more software modules in order to perform the operations of the above-described example embodiments of the present invention.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. An image enhancement system to adjust an input image according to an emotional scale of the input image, the image enhancement system comprising:
    an emotional scale detection unit to analyze a pixel value of one or more frames of the input image in order to automatically detect the emotional scale of the input image; and
    an image enhancement unit to enhance a quality of the input image based on an image mode selected according to the emotional scale,
    wherein the selecting of the image mode includes selecting the image mode of the input image based on an image mode corresponding to a predetermined emotional scale, and
    wherein the enhancing of the quality of the input image comprises adjusting an image factor according to the selected image mode.

2. The image enhancement system as claimed in claim 1, wherein the emotional scale detection unit comprises:
    an image parameter calculation unit to calculate at least one image parameter using the pixel value; and
    a Z score computation unit to compute a Z score of each of the at least one image parameter using image statistical data.

3. The image enhancement system as claimed in claim 2, wherein the image parameter calculation unit performs a color space conversion on the pixel value of the input image according to an image parameter, of the at least one image parameter, to be calculated.

4. The image enhancement system as claimed in claim 2, wherein the image parameter is a mathematical parameter representing a physical property of each of the one or more frames of the input image.

5. The image enhancement system as claimed in claim 2, wherein the Z score computation unit computes the Z score for a first image parameter, of the at least one image parameter, using a predetermined average and a predetermined standard deviation of the first image parameter of a plurality of predetermined images.

6. The image enhancement system as claimed in claim 5, wherein the Z score computation unit computes the Z score for the first image parameter according to:

$$Z_j = \frac{(V_j - V_{j\_mean})}{V_{j\_stdev}} (j = 1, 2, \ldots, n),$$

where $Z_j$ denotes the Z score for the first image parameter, $V_j$ denotes the first image parameter, and $V_{j\_mean}$ and $V_{j\_stdev}$ denote average and the standard deviation of the first image parameter of the plurality of predetermined images.

7. The image enhancement system as claimed in claim 2, wherein the emotional scale detection unit detects the emotional scale of the input image using the computed Z score of each of the at least image parameter and a Z score of the at least one image parameter with respect to at least one predetermined emotional scale.

8. The image enhancement system as claimed in claim 7, wherein the emotional scale detection unit detects the emotional scale to be a predetermined emotional scale, of the at least predetermined emotional scale, with a Z score having a least difference from the computed Z score.

9. The image enhancement system as claimed in claim 2, wherein the at least one image parameter includes an average luminance, a noisiness, an average saturation, a global contrast, a global saturation contrast, a color balance, a chromatic highlight, a highlight, a sharpness, a sharpness block, a speed of darkening and/or lightening, a speed of saturation, a speed of an object, a speed of camera motion, and/or a skin contrast of the input image.

10. The image enhancement system as claimed in claim 1, wherein the image enhancement unit comprises:
    an image mode selection unit to select the image mode of the input image according to the emotional scale; and
    an image factor adjustment unit to adjust the image factor of the input image based on an image factor adjustment parameter according to the image mode.

11. The image enhancement system as claimed in claim 10, wherein the image mode selection unit selects the image mode of the input image based on an image mode corresponding to a predetermined emotional scale.

12. The image enhancement system as claimed in claim 10, wherein the image factor adjustment unit adjusts a lightness, a contrast, and/or a saturation of the input image using the image factor adjustment parameter according to the image mode.

13. An image enhancement system to adjust an input image according to an emotional scale of the input image, the image enhancement system comprising:
    an image parameter calculation unit to calculate at least one image parameter using a pixel value of an input image;
    a Z score computation unit to compute a Z score of each of the at least one image parameter using image statistical data;
    an image mode selection unit to select an image mode of the input image according to the emotional scale detected using the Z score; and
    an image factor adjustment unit to adjust an image factor of the input image based on an image factor adjustment parameter according to the image mode,
    wherein the selecting of the image mode includes selecting the image mode of the input image based on an image mode corresponding to a predetermined emotional scale.

14. The image enhancement system as claimed in claim 13, wherein the image parameter calculation unit performs a color space conversion on the pixel value of the input image according to an image parameter, of the at least one image parameter, to be calculated.

15. The image enhancement system as claimed in claim 13, wherein the image mode selection unit selects the image mode of the input image based on an image mode corresponding to a predetermined emotional scale.

16. The image enhancement system as claimed in claim 13, further comprising an emotional scale detection unit to detect the emotional scale of the input image using the computed Z score of each of the at least one image parameter and a Z score of the at least one image parameter with respect to at least one predetermined emotional scale.

17. The image enhancement system as claimed in claim 13, wherein the image factor adjustment unit adjusts a lightness, a contrast, and/or a saturation of the input image using the image factor adjustment parameter according to the image mode.

18. The image enhancement system as claimed in claim 13, wherein the Z score computation unit computes the Z score for a first image parameter, of the at least one image parameter, using a predetermined average and a predetermined standard deviation of the first image parameter of a plurality of predetermined images.

19. An image enhancement method to adjust an input image according to an emotional scale of the input image, the image enhancement method comprising:
    analyzing a pixel value of one or more frames of the input image in order to automatically detect the emotional scale of the input image; and
    enhancing a quality of the input image based on an image mode selected according to the emotional scale,
    wherein the selecting of the image mode includes selecting the image mode of the input image based on an image mode corresponding to a predetermined emotional scale, and
    wherein the enhancing of the quality of the input image comprises adjusting an image factor according to the selected image mode.

20. The image enhancement method as claimed in claim 19, wherein the analyzing of the pixel value comprises:
    calculating at least one image parameter using the pixel value; and
    computing a Z score of each of the at least one image parameter using image statistical data.

21. The image enhancement method as claimed in claim 20, wherein the calculating of the at least one image parameter comprises performing a color space conversion on the pixel value of the input image according to an image parameter, of the at least one image parameter, to be calculated.

22. The image enhancement method as claimed in claim 20, wherein the image parameter is a mathematical parameter representing a physical property of each of the one or more frames of the input image.

23. The image enhancement method as claimed in claim 20, wherein the computing of the Z score comprises computing the Z score for a first image parameter, of the at least one image parameter, using a predetermined average and a predetermined standard deviation of the first image parameter of a plurality of predetermined images.

24. The image enhancement method as claimed in claim 23, wherein the computing of the Z score for the first image parameter comprises computing the Z score for the first image parameter according to:

$$Z_j = \frac{(V_j - V_{j\_mean})}{V_{j\_stdev}} (j = 1, 2, \ldots, n),$$

where $Z_j$ denotes the Z score for the first image parameter, $V_j$ denotes the first image parameter, and $V_{j\_mean}$ and $V_{j\_stdev}$ denote average and the standard deviation of the first image parameter of the plurality of predetermined images.

25. The image enhancement method as claimed in claim 20, wherein the detecting detects the emotional scale of the input image using the computed Z score and a Z score of an image parameter with respect to at least one predetermined emotional scale.

26. The image enhancement method as claimed in claim 25, wherein the analyzing of the pixel value comprises detecting the emotional scale of the input image using the computed Z score of each of the at least one image parameter and a Z score of the at least one image parameter with respect to at least one predetermined emotional scale.

27. The image enhancement method as claimed in claim 26, wherein the detecting of the emotional scale comprises detecting the emotional scale to be a predetermined emotional scale, of the at least one predetermined emotional scale, with a Z score having a minimum difference from the computed Z score.

28. The image enhancement method as claimed in claim 19, wherein the enhancing of the quality of the input image comprises:
    selecting the image mode of the input image according to the emotional scale; and
    adjusting the image factor of the input image based on an image factor adjustment parameter according to the image mode.

29. The image enhancement method as claimed in claim 28, wherein the selecting of the image mode comprises selecting the image mode of the input image based on an image mode corresponding to a predetermined emotional scale.

30. The image enhancement method as claimed in claim 28, wherein the adjusting of the image factor comprises adjusting a lightness, a contrast, and/or a saturation of the input image using the image factor adjustment parameter according to the image mode.

31. A computer readable recording medium encoded with the method of claim 19 and implemented by a computer.

32. An image enhancement method to adjust an input image according to an emotional scale of the input image, the image enhancement method comprising:
- calculating at least one image parameter using a pixel value of an input image;
- computing a Z score of each of the at least one image parameter using image statistical data;
- selecting an image mode of the input image according to the emotional scale detected using the Z score; and
- adjusting an image factor of the input image based on an image factor adjustment parameter according to the image mode,
- wherein the selecting of the image mode includes selecting the image mode of the input image based on an image mode corresponding to a predetermined emotional scale.

33. The image enhancement method as claimed in claim 32, wherein the calculating of the at least one image parameter comprises performing a color space conversion on the pixel value of the input image according to an image parameter, of the at least one image parameter, to be calculated.

34. A computer readable recording medium encoded with the method of claim 32 and implemented by a computer.

35. An image enhancement system to adjust an input image, the image enhancement system comprising:
- an emotional scale detection unit to automatically detect an emotional scale of the input image; and
- an image enhancement unit to enhance a quality of the input image according to the emotional scale,
- wherein the enhancing of the quality of the input image comprises selecting an image mode of the input image based on an image mode corresponding to a predetermined emotional scale, and adjusting an image factor according to the selected image mode.

36. An image enhancement method to adjust an input image, the image enhancement method comprising:
- automatically detecting an emotional scale of the input image; and
- enhancing a quality of the input image according to the emotional scale,
- wherein the enhancing of the quality of the input image comprises selecting an image mode of the input image based on an image mode corresponding to a predetermined emotional scale, and adjusting an image factor according to the selected image mode.

* * * * *